United States Patent Office 2,757,447
Patented Aug. 7, 1956

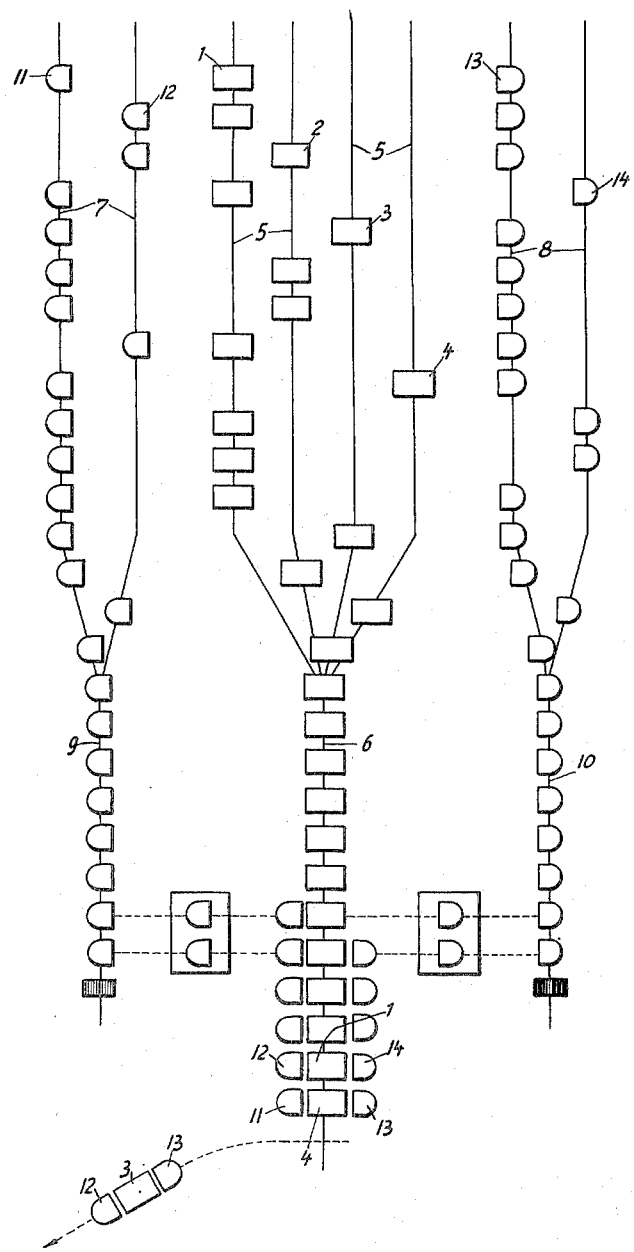

2,757,447
METHOD FOR ASSEMBLING MOTOR VEHICLES

Béla Barényi, Stuttgart-Rohr, Germany, assignor to Daimler-Benz Aktiengesellschaft, Stuttgart-Unterturkheim, Germany Application December 9, 1952, Serial No. 324,941

Claims priority, application Germany December 11, 1951

3 Claims. (Cl. 29—430)

My invention relates to a method of fabricating a motor vehicle on an assembly line by assembling a plurality of units or cells, such as hollow sheet metal bodies. An important feature of the invention resides in that each sub-unit or cell is assembled in an individual assembly line, and that the sub-units or cells are subsequently connected with each other.

Thus, according to the present invention, the motor vehicle is split up in a plurality of units or cells. That has the advantage that the space for fabricating the individual sub-units on an assembly line is split up in a plurality of spaces whereby the accessibility of the individual compartments of the sub-units is improved, enabling a larger number of laborers to be employed, thereby permitting of an advantageous reduction of the production time.

It is an object of the present invention to provide a method of forming assembly lines of motor vehicles of various types to be fabricated in one and the same process. According to the invention, this object is attained by assembling several types of a sub-unit or cell in the assembly line provided for the same and by assembling the different types of sub-units or cells at the end of the main assembly line corresponding to the demand for different types of motor vehicles. In this process the individual types of sub-units may be assembled either on a common assembly line or on individual assembly lines. In the latter event, the individual types of sub-units are either led together in an assembly line for each sub-unit or the sub-units are assembled in their individual assembly lines leading to the main assembly line; the components of the individual sub-units may be preferably stacked at the end of their assembly line.

In order to permit of a rapid exchange of faulty sub-units in the event of a damage of the motor vehicles, according to the invention a certain supply of each sub-unit or cell can be preferably created by assembling a greater number of sub-units than is required for the production of each motor vehicle, the surplus sub-units being stored. Where a motor vehicle is to be built up from hollow sheet metal units, a greater number of end units is produced than middle units. The surplus of end units over the number of middle units corresponds to the average use thereof caused by accidents within a certain period of time.

An assembly line for carrying out the process according to the invention is preferably so designed that the individual sub-units or cells are mounted transversely to their movement. This arrangement involves the advantage of reducing the length of the assembly line and facilitating the assembly of the sub-units.

Where motor vehicles are composed of hollow sheet metal units, the assembly line system, according to the invention, may comprise a central assembly line for the middle sheet metal unit and for the assembly of the sheet metal units, and subsidiary assembly lines for the end sheet metal units, said subsidiary assembly lines being located on either side of the central assembly line extending parallel to the latter.

The drawing illustrates an embodiment of the invention diagrammatically showing an assembly line for the performance of the method according to the present invention, said assembly line serving the fabrication of motor vehicles from hollow sheet metal units or cells.

1, 2, 3 and 4 denote four different types of the middle hollow sheet metal units or cells of a vehicle to be composed of such hollow sheet metal units. The middle unit or cell 1 is to be used for the production of a car having three seats; the middle unit or cell 2 is to be used for the production of a delivery van; the middle unit or cell 3 is to be used for the production of a convertible roadster; and the middle unit or cell 4 is to be used for the production of a car having six seats. Each of the four types of middle units or cells is assembled in an individual assembly line 5. The assembly lines 5 are led together to a common main assembly line 6. The number of the sub-units assembled in the individual assembly lines 5 depends on the demand to be met at any time.

A pair of assembly lines 7, or 8 respectively, is provided on either side of the lines 5 and 6 preferably extending parallel thereto, the lines of each pair being led together to a single line 9, or 10 respectively. On the left pair of assembly lines 7 two different types of a hollow sheet metal unit or cell constituting the front portion of a motor car are assembled, to wit a front unit or cell 11 constituting the baggage compartment and a front unit or cell 12 without any baggage compartment. On the right hand assembly lines 8 two different types of tail units or rear cells are assembled, each tail unit being a hollow sheet metal structure constituting the rear end of a motor car. For instance, on line 8 a tail unit or rear cell 13 equipped with a six-cylinder engine of the carburetor type ("Otto-engine") and a tail unit or rear cell 14 equipped with a four-cylinder diesel-engine are assembled. The number of the sub-units of the various types, such as 11, 12, 13 and 14, that are being fabricated on the individual assembly lines 7 and 8 depends on the demand existing. The completed sub-units are led together in the assembly lines 9 and 10 and are stacked at the ends thereof. A certain proportion, preferably of the two-tail units, is assembled in excess of the demand existing and is transported to a stock or storage room of spare parts.

The middle units or cells 1, 2, 3 and 4 are disposed transversely to their movement while being assembled, and the end units or cells 11, 12, 13 and 14 are preferably so disposed, at least when approaching the ends of the assembly lines 9 and 10, that their joint faces the middle unit. At the end of the main assembly line 6 the finished units are only connected to each other. Thus, by combining the different types of sub-units or cells, six motor vehicles of different types may be assembled at the end of the assembly line, such as a six-cylinder convertible roadster having a small front unit being composed of the sub-units 12, 3 and 13, or a six-cylinder car having six seats and a large front unit being composed of the units 11, 4 and 13, or a four-cylinder car having three seats and a small front unit being composed of the sub-units 12, 1 and 14. Altogether in the embodiment of the assembly line according to the invention shown in the drawing sixteen different types of motor vehicles may be produced.

In lieu of providing an individual assembly line for each type of sub-unit, a plurality of types may be assembled in a common assembly line. For the production of the tail unit types 11, 12, 13 and 14, I may refrain from leading the lines 7 together to form a single line 9, or from leading the lines 8 together to form a single line 10. In other words, the lines 7 may be kept separate up to the point where the sub-unit has been fully assembled and, similarly, the pair of lines 8 may be kept separate up to that point.

Having now described a preferred embodiment of my invention with specific reference to the details thereof, I wish it to be clearly understood that my invention is in no way restricted to such specific details but is capable of numerous modifications within the scope of the appended claims.

What I claim is:

1. Method for assembly line manufacture of various types of motor vehicles each composed of a plurality of assembled sub-units including a middle unit and two end units consisting of a front unit and a rear unit, the different types of vehicles being obtained by the use of different combinations of end units connected to different types of middle units comprising the steps of separately and substantially completely assembling various types of end units and middle units in individual assembly lines, the assembly lines of the end units being arranged laterally of the main assembly line of the middle unit, and thereafter assembling two selected end units with a selected middle unit at the end of the main assembly line corresponding to the particular demand for the different types of motor vehicles.

2. Method according to claim 1, wherein at least the middle units are arranged transversely to the movement thereof in the corresponding assembly lines during the assembly thereof, and wherein during the assembly of the end units with the middle units at the end of the main assembly line the assembled end units are connected with the middle units from the two sides of the transversely arranged middle units.

3. Method according to claim 1, wherein more end units are assembled than middle units and the surplus of end units are stored, the surplus of end units with respect to the middle units corresponding to the average use thereof caused by accidents over and above the normal requirement within a predetermined time interval.

References Cited in the file of this patent

UNITED STATES PATENTS

| | | |
|---|---|---|
| 1,772,735 | Romine | Aug. 12, 1930 |
| 1,876,759 | Romine | Sept. 13, 1932 |
| 2,087,626 | Minshall | July 20, 1937 |
| 2,356,540 | Schwinn | Aug. 22, 1944 |
| 2,383,225 | Sorensen | Aug. 21, 1945 |
| 2,405,544 | Anjeskey | Aug. 13, 1946 |
| 2,451,454 | Watter | Oct. 12, 1948 |

OTHER REFERENCES

"Aviation," pages 148, 165, July 1943.